(12) United States Patent
Manneveau et al.

(10) Patent No.: US 9,772,103 B2
(45) Date of Patent: Sep. 26, 2017

(54) ENHANCED DEVICE FOR PIERCING PLUGS IN A STEAM GENERATOR

(71) Applicant: AREVA NP, Courbevoie (FR)

(72) Inventors: Eric Manneveau, Crissey (FR); Jean-Claude Simonato, Granges (FR)

(73) Assignee: AREVA NP, Courbevoie (FR)

( * ) Notice: Subject to any disclaimer, the term of this patent is extended or adjusted under 35 U.S.C. 154(b) by 510 days.

(21) Appl. No.: 14/563,617

(22) Filed: Dec. 8, 2014

(65) Prior Publication Data

US 2016/0356487 A1  Dec. 8, 2016

(30) Foreign Application Priority Data

Dec. 9, 2013  (FR) ..................................... 13 62314

(51) Int. Cl.
| | | |
|---|---|---|
| *F22B 37/00* | (2006.01) | |
| *B23B 41/10* | (2006.01) | |
| *F28F 11/02* | (2006.01) | |
| *B23P 19/02* | (2006.01) | |

(52) U.S. Cl.
CPC ............ *F22B 37/003* (2013.01); *B23B 41/10* (2013.01); *B23P 19/025* (2013.01); *F28F 11/02* (2013.01)

(58) Field of Classification Search
CPC ..... B23P 19/025; B23P 19/027; B23P 19/022; B25B 27/02; B25B 27/023; B25B 27/026; B25B 27/062; B25B 27/064; F22B 37/003; F22B 37/005; B32B 41/10; Y10T 29/531; Y10T 29/49532; Y10T 29/49821; Y10T 29/49824; Y10T 29/49721; Y10T 29/53122; Y10T 29/53113; Y10T 29/49822; Y10T 29/5199; Y10T 29/49881

See application file for complete search history.

(56) References Cited

U.S. PATENT DOCUMENTS

| | | | | |
|---|---|---|---|---|
| 3,791,011 | A | * | 2/1974 | Keys ..................... B25B 27/026 29/252 |
| 3,863,976 | A | | 2/1975 | Loch |
| 4,366,617 | A | * | 1/1983 | Nanstiel ................ B25B 27/026 29/252 |
| 4,555,833 | A | * | 12/1985 | Hawkins ............. B23B 51/0426 29/33 T |
| 4,734,972 | A | | 4/1988 | Hawkins |
| 4,800,637 | A | * | 1/1989 | Overbay ................. B23P 11/02 29/402.03 |

(Continued)

FOREIGN PATENT DOCUMENTS

FR    2 669 255 A1    5/1992

*Primary Examiner* — Christopher Besler

(74) *Attorney, Agent, or Firm* — Davidson, Davidson & Kappel, LLC

(57) ABSTRACT

An enhancing device for piercing plugs in a steam generator is provided. The enhancing device includes a main body, and a bit, borne by the main body and extending along a longitudinal axis. The bit may be driven into rotation around its longitudinal axis, in order to perform an action for piercing a plug. The device includes a hollow tubular element, extending along the longitudinal axis, while surrounding the bit and coaxially with this bit, the tubular element including an outer surface having a screwing thread, intended to be screwed onto the plug prior to the piercing. The tubular element may be driven into rotation around the longitudinal axis, independently of the rotation of the bit.

9 Claims, 3 Drawing Sheets

(56) References Cited

U.S. PATENT DOCUMENTS

| | | | | |
|---|---|---|---|---|
| 4,903,392 A | * | 2/1990 | Stickel | B23P 19/025 29/426.1 |
| 5,465,483 A | * | 11/1995 | Fink | B23P 19/025 138/89 |
| 5,517,740 A | * | 5/1996 | Costlow | B23P 19/025 173/17 |
| 5,664,328 A | * | 9/1997 | Fink | B23P 19/025 138/89 |
| 6,189,212 B1 | * | 2/2001 | Hawkins | B23P 19/025 29/723 |
| 2016/0356487 A1 | * | 12/2016 | Manneveau | B23B 41/10 |

* cited by examiner

ENHANCED DEVICE FOR PIERCING PLUGS IN A STEAM GENERATOR

The present invention relates to a device for piercing plugs in a steam generator.

An electric power station with a nuclear reactor conventionally includes heat exchangers also called <<steam generators>>. Such a steam generator includes a plurality of tubes, in which a first fluid circulates, and outside which a second fluid surrounds these tubes. Thus, heat exchange is possible between these first and second fluids.

The first fluid, circulating in the tubes, is generally radioactive, so that it is important that it does not have the possibility of escaping from the tubes or of contaminating the second fluid surrounding these tubes. It is therefore important to avoid leaks on one of the tubes, in which case both fluids may mix together.

Thus, in the case when a damaged tube has a leak, this damaged tube is generally blocked with what is called a steam generator plug, so that a fluid no longer circulates in this tube.

It is sometimes necessary to subsequently remove such a plug, for example with view to replacing it or together with a repair of the corresponding tube.

BACKGROUND

For this purpose, a device for piercing steam generator plugs is known from the state of the art, notably from U.S. Pat. No. 4,734,972, comprising a main body and a bit borne by this main body and extending along a longitudinal axis. This bit may be driven into rotation around its longitudinal axis, in order to perform an action for piercing a plug.

Such a piercing device is generally handled by means of a handling device, also called a holder.

SUMMARY OF THE INVENTION

During the piercing of a plug, the forces related to this piercing are absorbed by the holder which therefore requires that it be firmly held by an operator carrying out the piercing. Thus, it is notably not possible to use a sufficiently long holder for allowing handling of the piercing device from the outside of the steam generator. Indeed, a long holder would imply a too large lever arm for the forces absorbed by the holder, which would oppose accurate handling of the piercing device.

An object of the invention is to find a remedy to this drawback, by proposing a piercing device allowing a reduction in the forces absorbed by the holder during the piercing of a plug.

A device for piercing plugs in a steam generator is provided. The device includes:
  a main body;
  a bit, borne by the main body, and extending along a longitudinal axis, said bit being able to be driven into rotation around its longitudinal axis in order to perform an action for piercing a plug,
characterized in that it includes a hollow tubular element, extending along the longitudinal axis, by surrounding the bit and coaxially with this bit, the tubular elements comprising outer surface having a screwing thread, intended to be screwed onto the plug before piercing, the tubular element being able to be driven into rotation around the longitudinal axis, independently of the rotation of the bit.

The hollow tubular element which is independent of the bit, is screwed onto the plug prior to piercing. Thus the forces related to the piercing are absorbed by the plug via this hollow tubular element rather than through the holder.

The forces absorbed by the holder are thereby reduced, so that it is possible to use a sufficiently long holder in order to allow the operator to carry out the piercing from the outside of the steam generator. In this case, the operator is thus less exposed to radiations than when he/she uses a piercing device of the state of the art.

A piercing device according to the invention may further include one or more of the following features, taken alone or according to all the technically conceivable features.
  The piercing device comprises a first motor provided with a first output shaft, and a first driver for driving into rotation the bit around the longitudinal axis, through the first output shaft.
  The first output shaft is radially offset relatively to the longitudinal axis, the first driver including at least one piercing drive pinion, bound in rotation to the bit, and a piercing axis pinion bound in rotation to the bit, driven into rotation by the piercing drive pinion, for example via an intermediate piercing pinion meshing with the piercing drive pinion and with the piercing axis pinion.
  The first motor is a pneumatic motor.
  The piercing device comprises a second motor provided with a second output shaft and a second driver for driving into rotation the hollow tubular element around the longitudinal axis, through the second output shaft.
  The second output shaft is radially offset relatively to the longitudinal axis, and angularly shifted relatively to the first output shaft, the second driver including at least one screwing drive pinion bound in rotation to the second output shaft, and a screwing axis pinion, bound in rotation to the hollow tubular element, driven into rotation by the screwing drive pinion, for example via an intermediate screwing pinion meshing with the screwing drive pinion and with the screwing axis pinion.
  The second motor is an electric motor.
  The device includes an elongated element between a proximal handing end, and a distal end to which is attached the piercing device.

A method for piercing a plug in a steam generator, by means of a piercing device as defined above, is also provided. The method includes a preliminary step for screwing the tubular element onto the plug, followed by a step for piercing the plug with the bit.

BRIEF SUMMARY OF THE DRAWINGS

The invention will be better understood upon reading the description which follows, only given as an example and made with reference to the appended figures wherein.

DETAILED DESCRIPTION

A device 10 for piercing a plug 12 in a steam generator is illustrated in the figures.

Figure 1:
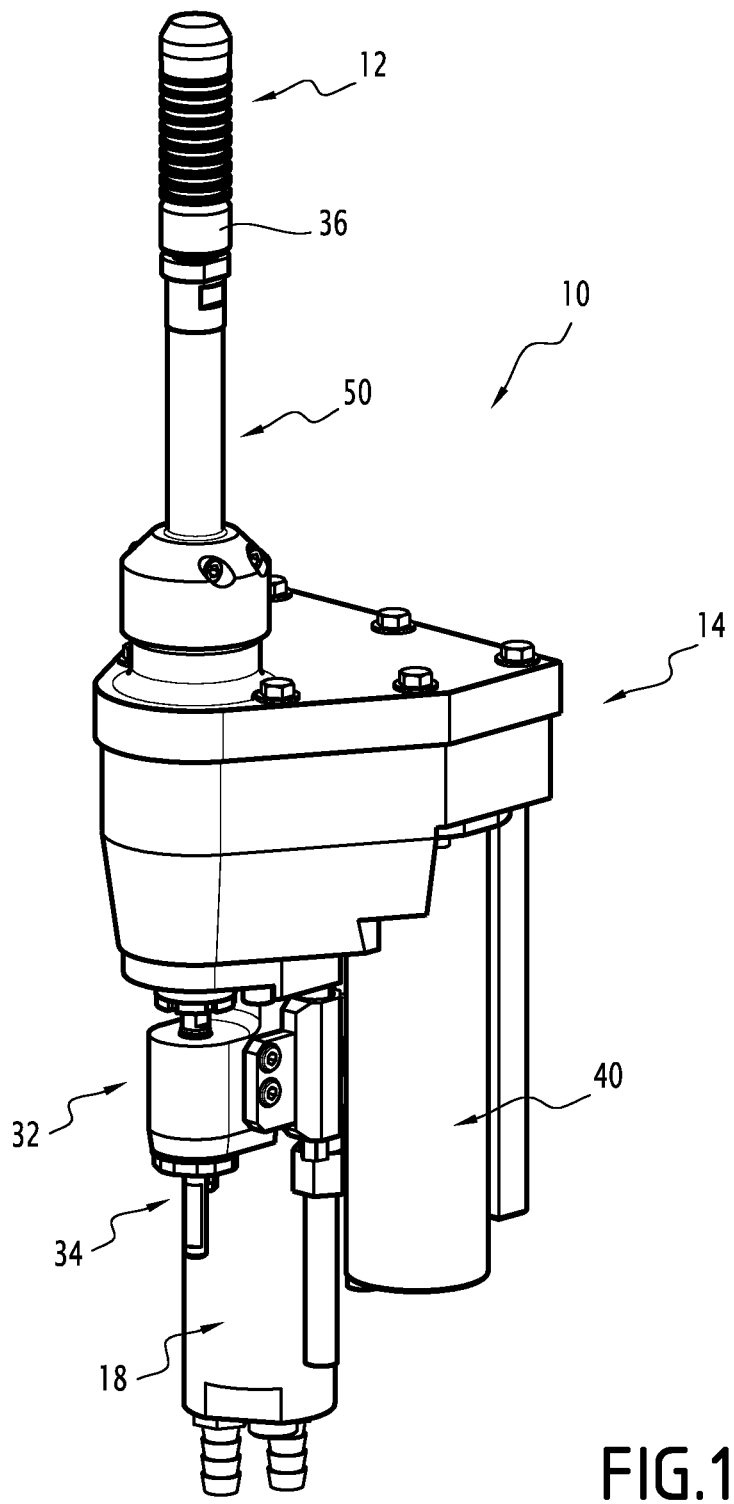
FIG. 1 is a perspective view of a piercing device according to an exemplary embodiment of the invention.
Figure 2:
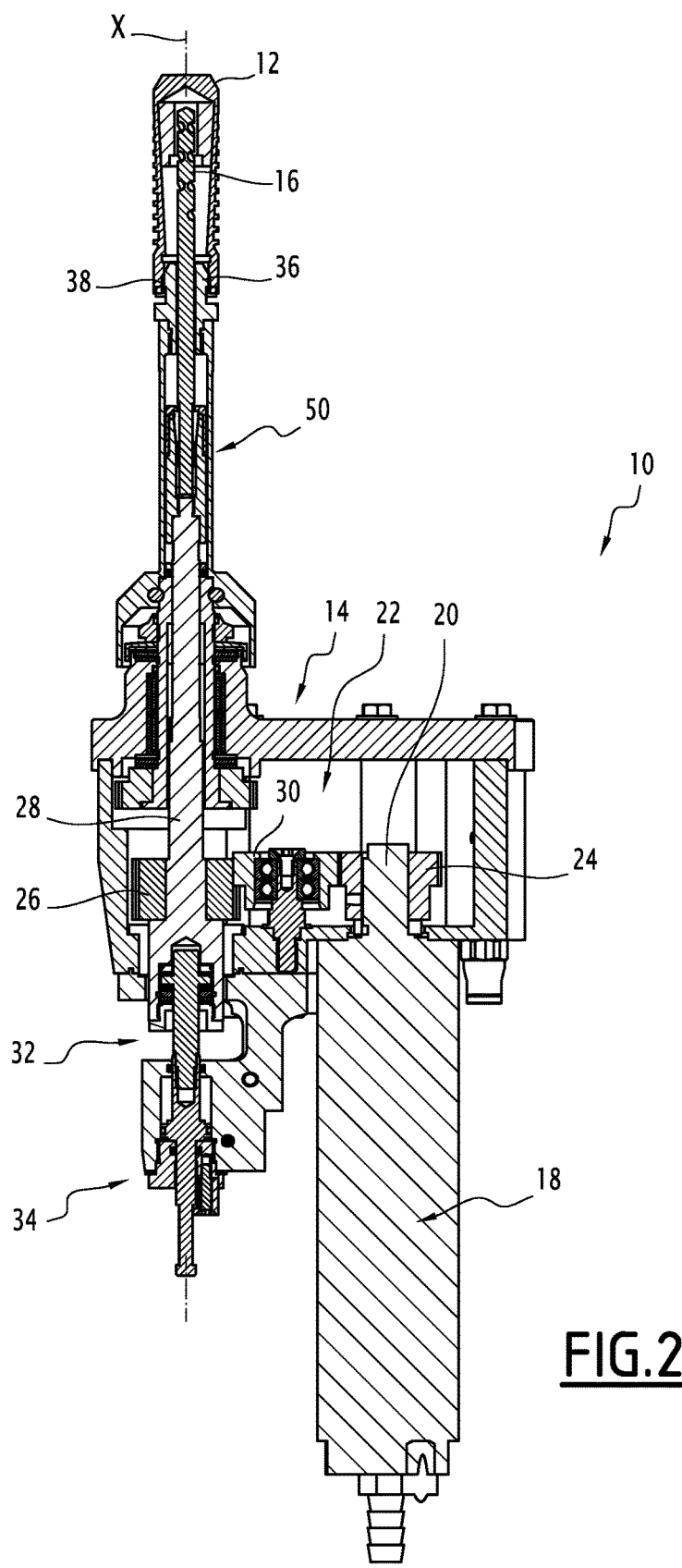
FIG. 2 is a sectional view of the piercing device of FIG. 1, in a first sectional plane.
Figure 3:
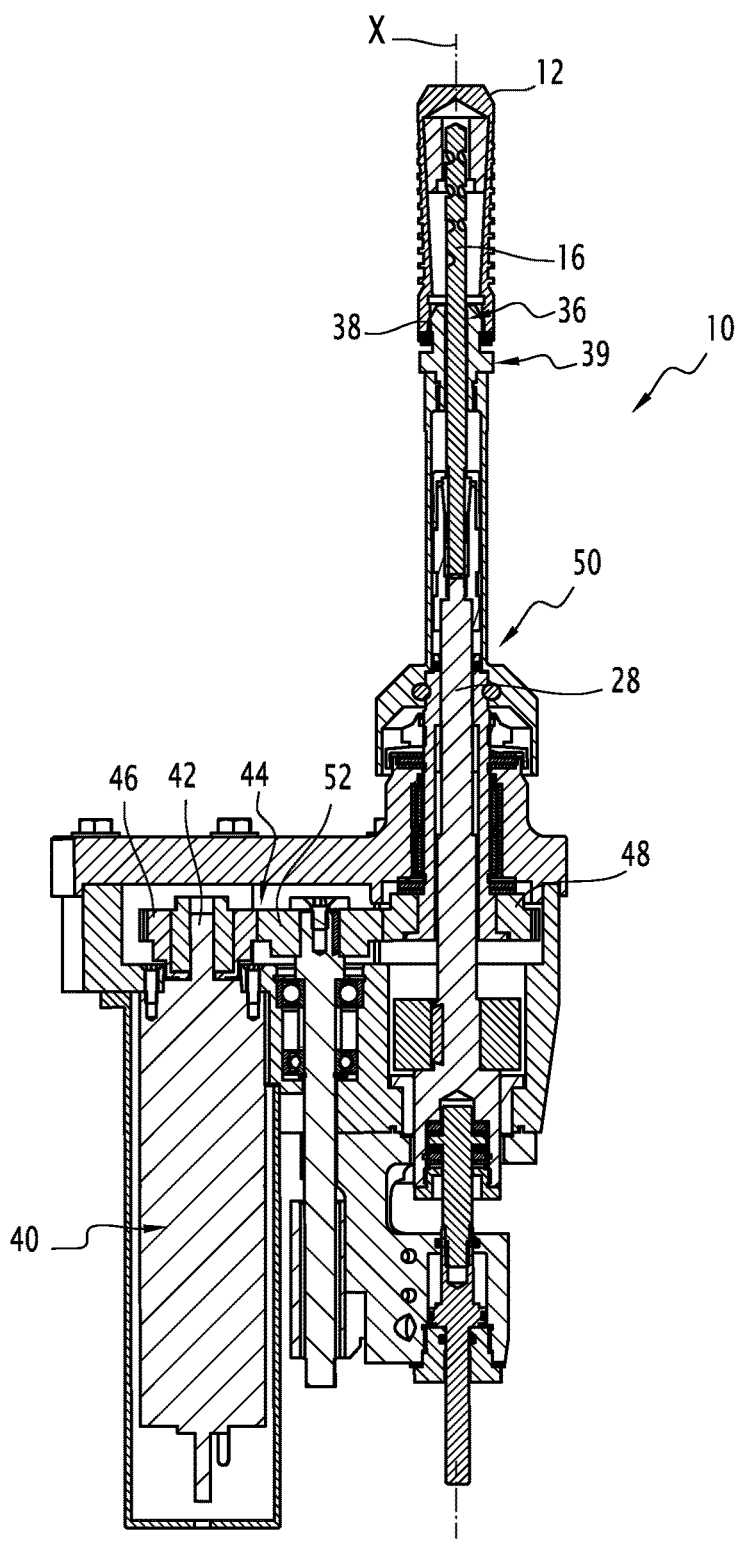
FIG. 3 is a sectional view of the piercing device of FIG. 1, in a second sectional plane angularly shifted relatively to said first sectional plane.

The piercing device 10 includes a main body 14, bearing a piercing bit 16, and visible in FIGS. 2 and 3.

The bit 16 extends along a longitudinal axis X. This bit 16 may be driven into rotation around this longitudinal axis X, and in translation along this longitudinal axis X, in order to carry out an action for piercing the plug 12.

In order to drive the bit 16 into rotation, the piercing device 10 comprises a first motor 18, provided with a first output shaft 20, and a first driver 22 for driving the bit 16 into rotation around the longitudinal axis X by this first output shaft 20.

The first motor 18 is for example a pneumatic motor of a conventional type, but may alternatively be formed by any suitable motor.

As this is notably illustrated in FIG. 2, the first output shaft 20 is radially offset relatively to the longitudinal axis X. The first driver 22 then includes gear elements notably, pinions, housed in the body 14, and forming a power train between the first output shaft 20 and the bit 16.

More particularly, the first driver 22 includes a piercing drive pinion 24 interdependent in rotation with the first output shaft 20, and a piercing axis pinion 26, interdependent in rotation with the bit 16, via a rod 28 secured to the piercing axis pinion 26 and to the bit 16.

The piercing axis pinion 26 is driven into rotation by the piercing drive pinion 24, for example via an intermediate piercing pinion 30, meshing with the piercing drive pinion 24 on the one hand and with the piercing axis pinion 26 on the other hand.

Advantageously, the piercing drive pinion 24, the piercing axis pinion 26 and the intermediate pinion 30 do not include the same number of teeth, in order to change the velocity and/or torque ratio between the first output shaft 20 and the bit 16.

The piercing device 10 also includes a translational driver 32 for driving the bit 16 into a station along its longitudinal axis X. The bit 16 is thus movable along the longitudinal axis between a rest position, illustrated in FIG. 2, and a piercing position not shown.

It should be noted that the piercing axis pinion 26 has sufficient height in the direction of the longitudinal axis X so as to remain engaged with the intermediate piercing pinion 30 both in the rest position and in the piercing position. Alternatively, it is the intermediate piercing pinion 30 which has sufficient height parallel to the longitudinal axis X, so that the piercing axis pinion 26 remains engaged regardless of its position.

The translational driver 32 includes in a standard way a hydraulic cylinder actuator 34 known per se, which will therefore not be further described.

In order to attach the piercing device 10 onto the plug 12 prior to piercing this plug, the piercing device 10 includes a hollow tubular element 36, extending along the longitudinal axis while surrounding the bit 16 and coaxially with the latter.

The tubular element 36 comprises an outer surface 38 having a screwing thread, intended to be screwed into the inside of the plug 12, prior to piercing.

It should be noted that the tubular element 36 is detachable so that it is possible to replace it, in order to select a similar tubular element 36 of dimensions adapted to the plug to be pierced.

It will be noted that a steam generator plug 12 conventionally includes a blind cavity inherent to conventional methods for setting up this plug in a steam generator tube. It is in this blind cavity that the tubular element 36 is intended to be screwed in.

Advantageously, the tubular element 36 includes an abutment 39, for example formed by a flange, intended to come into contact with the mouth of the blind cavity of the plug 12 in order to limit screwing of the tubular element 36 inside this cavity. Preferably, the abutment 39 is elastically deformable, in order to allow gradual stopping of the screwing.

In order to allow this screwing, the tubular element 36 may be driven into rotation around the longitudinal axis X, independently of the rotation and/of the translation of the bit 16.

For this purpose, the piercing device 10 comprises a second motor 40, provided with a second output shaft 42, and a second driver 44 for driving the hollow tubular element 36 into rotation around the longitudinal axis X through this second output shaft 42.

The second motor 40 is for example an electric motor, but it may alternatively be formed by any other type of suitable motor.

As this is notably illustrated in FIG. 3, the second output shaft 42 is radially offset relatively to the longitudinal axis X. Further, this second output shaft 42 is angularly shifted, around the longitudinal axis X, relatively to the first output shaft 20. Thus, the first 18 and second 40 motors are laid out parallel to each other, and that both are borne by the main body 14.

The second driver 44 then includes engagement elements, notably pinions, housed in the body 14, and forming a power train between the second output shaft 42 and the hollow tubular element 36.

More particularly, the second driver 44 includes a screwing drive pinion 46 bound in rotation to the second output shaft 42, and a screwing axis pinion 48 bound in rotation to the hollow tubular element 36, via a hollow tubular member 50 surrounding the rod 28. Advantageously, the hollow tubular member 50 is removable, in order to allow simple replacement of the bit 16 when this is necessary.

The screwing axis pinion 48 is driven into rotation by the screwing drive pinion 46, for example via an intermediate screwing pinion 52 meshing with the screwing drive pinion 46 on the one hand and with the screwing axis pinion 48 on the other hand. It should be noted that the axis of the intermediate screwing pinion 52 is accessible so as to allow manual unscrewing of the plug.

Advantageously, the screwing drive pinion 46, the screwing axis pinion 48 and the intermediate screwing pinion 52 do not include the same number of teeth, in order to change the speed and/or torque ratio between the second output shaft 42 and the hollow tubular element 36.

It will be noted that in such a piercing device 10 may be handled by means of a handling device, natively including an elongated element between a proximal handling end and a distal end to which is attached the piercing device 10.

Because the forces related to the piercing are mainly absorbed by the plug, and not by the handing device, said elongated element may be sufficiently long so as to allow handling of the piercing device 10 from the outside of the steam generator.

A piercing device 10 according to the invention only gives the possibility of carrying out a piercing method which will now be described.

During a first step, the piercing device 10 is led, by means of the handling device to the proximity of a plug 12 to be pierced, by introducing the bit 16 into the inside of the latter until the tubular element 36 comes into contact with the mouth of the blind cavity of the plug 12.

The method then includes a step for screwing the tubular element 36 onto the plug 12. For this purpose, the second motor 40 is enabled, the driving into rotation the tubular element 36 via the second driver 44. With this rotation, the tubular element 36 will be screwed into the plug 12, until the mouth of the plug 12 will abut on the abutment 39 of the tubular element 36.

The piercing device 10 is then firmly maintained at the plug 12.

The piercing method then subsequently includes a step for piercing the plug with the bit 16. For this purpose, the first motor 18 is enabled in order to drive into rotation the bit 16, via the first driver 22, and the translational driver 32 are also enabled in order to bring the bit 16 into its piercing position.

The piercing is thus carried out, the forces related to the piercing being absorbed by the plug 12, via the tubular element 36 screwed onto this plug 12.

It will be noted that the invention is not limited to the embodiment described earlier, but may have diverse alternatives without departing from the scope of the claims.

What is claimed is:

1. A piercing device for piercing plugs in a steam generator comprising:
   a main body,
   a bit borne by the main body, the bit extending along a longitudinal axis, the bit being drivable into rotation around its longitudinal axis in order to perform an action for piercing a plug;
   a hollow tubular element extending along the longitudinal axis by surrounding the bit and being arranged coaxially with the bit, the hollow tubular element including an outer surface having a screwing thread for screwing onto the plug prior to piercing, the hollow tubular element being drivable into rotation around the longitudinal axis independently of the rotation of the bit;
   a first motor provided with a first output shaft; and
   a first driver for driving into rotation the bit around the longitudinal axis through the first output shaft,
   wherein the first output shaft is radially offset relative to the longitudinal axis, the first driver including at least one piercing drive pinion bound in rotation to the first output shaft and a piercing axis pinion bound in rotation to the bit, the piercing axis pinion being driven into rotation by the piercing drive pinion.

2. The piercing device as recited in claim 1 wherein the piercing axis pinion is driven into rotation by the piercing drive pinion via an intermediate piercing pinion engaging with the piercing drive pinion and with the piercing axis pinion.

3. The piercing device as recited in claim 1 wherein the first motor is a pneumatic motor.

4. The piercing device as recited in claim 1 further comprising:
   a second motor provided with a second output shaft; and
   a second driver for driving into rotation the hollow tubular element around the longitudinal axis through the second output shaft.

5. The piercing device as recited in claim 4 wherein the second output shaft is radially offset relative to the longitudinal axis and angularly shifted relative to the first output shaft, the second driver including at least one screwing drive pinion bound in the rotation to the second output shaft and a screwing axis pinion bound in rotation to the hollow tubular element, the screwing axis pinion being driven into rotation by the screwing drive pinion.

6. The piercing device as recited in claim 5 wherein the screwing axis pinion is driven into rotation by the screwing drive pinion via an intermediate screwing pinion engaging with the screwing drive pinion and with the screwing axis pinion.

7. The piercing device as recited in claim 4 wherein the second motor is an electric motor.

8. A device for handling a piercing device as recited claim 1 comprising an elongated element extending between a proximal handling end, and a distal end to which is attached the piercing device.

9. A method for piercing a plug in a steam generator, by means of a piercing device comprising:
   a main body;
   a bit, borne by the main body, and extending along a longitudinal axis, said bit being able to be driven into rotation around its longitudinal axis, in order to perform an action for piercing a plug,
   a hollow tubular element, extending along the longitudinal axis, by surrounding the bit and coaxially with this bit, the hollow tubular element comprising an outer surface having a screwing thread, intended to be screwed onto the plug prior to piercing, the hollow tubular element being able to be driven into rotation around the longitudinal axis, independently of the rotation of the bit;
   a first motor provided with a first output shaft; and
   a first driver for driving into rotation the bit around the longitudinal axis through the first output shaft,
   wherein the first output shaft is radially offset relative to the longitudinal axis, the first driver including at least one piercing drive pinion bound in rotation to the first output shaft and a piercing axis pinion bound in rotation to the bit, the piercing axis pinion being driven into rotation by the piercing drive pinion,
the method comprising:
   a preliminary step for screwing the tubular element onto the plug, followed by a step for piercing the plug with the bit.

* * * * *